(12) United States Patent
Wang et al.

(10) Patent No.: US 8,724,584 B2
(45) Date of Patent: May 13, 2014

(54) METHOD FOR VIRTUAL CONNECTION RELEASING IN INTER-OPERATING NETWORK

(75) Inventors: Wei Wang, Shenzhen (CN); Xiaowu Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 217 days.

(21) Appl. No.: 13/130,909

(22) PCT Filed: Sep. 24, 2009

(86) PCT No.: PCT/CN2009/074204
§ 371 (c)(1),
(2), (4) Date: Jun. 22, 2011

(87) PCT Pub. No.: WO2010/060320
PCT Pub. Date: Jun. 3, 2010

(65) Prior Publication Data
US 2011/0261788 A1    Oct. 27, 2011

(30) Foreign Application Priority Data

Nov. 26, 2008    (CN) .......................... 2008 1 0227331

(51) Int. Cl.
*H04W 4/00*    (2009.01)
(52) U.S. Cl.
USPC ........................................................ 370/331
(58) Field of Classification Search
USPC ........................................................ 370/331
See application file for complete search history.

(56) References Cited

U.S. PATENT DOCUMENTS

| | | | | |
|---|---|---|---|---|
| 2004/0063431 A1* | 4/2004 | Julka et al. | ..................... | 455/436 |
| 2008/0043674 A1* | 2/2008 | Suh et al. | ..................... | 370/331 |
| 2010/0054207 A1* | 3/2010 | Gupta et al. | ..................... | 370/331 |
| 2010/0215019 A1* | 8/2010 | Velev et al. | ..................... | 370/331 |

FOREIGN PATENT DOCUMENTS

| | | |
|---|---|---|
| CN | 1953606 | 10/2005 |
| CN | 1953606 | 4/2007 |
| CN | 101047710 | 10/2007 |
| CN | 101047710 | 5/2010 |
| JP | 2000156688 | 6/2000 |
| JP | 3090131 | 9/2000 |

OTHER PUBLICATIONS

Wu Jianjun Cao, Method for implementing terminal denetworking at agent mobile network protocol, Huawei Technology co, Jan. 3, 2007, machine translated document, CN 101047710.*
ISA/CN, The State Intellectual Property Office, International Search Report for International Application PCT/CN2009/074202, date of mailing Jan. 7, 2010.

* cited by examiner

*Primary Examiner* — Mark Rinehart
*Assistant Examiner* — Maharishi Khirodhar
(74) *Attorney, Agent, or Firm* — Bright IP Law Offices

(57) ABSTRACT

The present invention provides a virtual connection releasing method in an inter-operation network. In the inter-operation network between the Enhanced Universal Terrestrial Radio Access Network (E-UTRAN) and the evolved HRPD (eHRPD) Access Network, a PMIP indication is set for indicating whether the HRPD Serving Gateway HSGW needs to initiate the Proxy Mobile IP (PMIP) binding updating operation or not. When the virtual connection releasing is initiated, the evolved Access Network (eAN) sends the A9-releasing-A8 message, which carries the PMIP indication, to the evolved Packet Control Function (ePCF). After obtaining the PMIP indication through the ePCF, the HRPD Serving Gateway determines whether to initiate the PMIP binding updating operation according to the PMIP indication. Application of the present invention enables the virtual connection releasing under the structure of the inter-operation between E-UTRAN and the eHRPD, and improves the virtual connection maintenance under the structure of the inter-operation between the E-UTRAN and the eHRPD.

6 Claims, 2 Drawing Sheets

METHOD FOR VIRTUAL CONNECTION RELEASING IN INTER-OPERATING NETWORK

FIELD OF THE INVENTION

The present invention relates to a virtual connection maintenance technology in the wireless communication system, in particular to a virtual connection releasing method for improving virtual connection maintenance under the structure of the inter-operation network between the Enhanced Universal Terrestrial Radio Access Network (E-UTRAN) and the evolved High Rate Packet Data (eHRPD) Access Network.

BACKGROUND OF THE INVENTION

With the rapid development of the mobile communication technology, and the increasingly higher demand of people for the high rate data service, High Rate Packet Data (HRPD) Access Network has been constantly evolving. In order to realize the Inter-operation with the Enhanced Universal Terrestrial Radio Access Network (E-UTRAN), the HRPD Access Network evolved into an Evolved HRPD (eHRPD) Access Network.

FIG. 1 is a schematic diagram of the network structure of the inter-operation between E-UTRAN and eHRPD in the prior art. As shown in FIG. 1, the eHRPD Access Network includes an evolved Access Terminal (eAT), an evolved Access Network (eAN), an evolved Packet Control Function (ePCF), a High Rate Packet Data Serving Gateway (HSGW), an Authentication Authorization Accounting of Access Network (AN-AAA), wherein the eAT is connected with the eAN via an air interface, the eAN is connected to the evolved Packet Control Function entity via A8 and A9 interfaces, to the Authentication Authorization Accounting entity via A12 interface, to 1× Base Station via A21 interface, to Mobile Handoff Center/Simulated Mobile Handoff Center via A21 interface and through inter-operation solution function entity, or directly connected to the Mobile Handoff Center/Simulated Mobile Handoff Center via A1/A1p interface; the evolved Packet Control Function entity is connected with the High Rate Packet Data Serving Gateway via A10 and A11 interfaces; different A interfaces for transforming different signaling/data are connected between an initial evolved Access Network and objective Access Network; and eAN is also connected with the Mobility Management Entity (MME) of the E-UTRAN via S101 interface.

In the inter-operation network between the E-UTRAN and the eHRPD, the eAT can be accessed to the eHRPD system via the E-UTRAN system. Particularly, the eAT keeps residing in the E-UTRAN system via the S101 interface between the initial eAN and the MME, and in the meantime can realize the handoff toward the active state of the eHRPD through three phases of Pre-registration, Handoff Preparation and Handoff Execution, wherein during the Pre-registration phase, the eAT establishes a eHRPD session and relevant IP context with the eAN via S101 interface; during Handoff Preparation phase, after the E-UTRAN system determines the time for the handoff, the eHRPD system allocates the wireless resources; and during Handoff Execution phase, the eAT is accessed to eHRPD system via HRPD wireless interface according to the allocated wireless resources. Therefore, the seamless handoff from the E-UTRAN system to the eHRPD system can be realized.

In the process of the handoff toward the active state of eHRPD, during Pre-registration phase, since the eAT is accessed to the eAN via S101 interface, the HRPD connection between the eAT and the eAN is named as Virtual Connection (VC). Correspondingly, for the Handoff Execution phase, when the eAT is accessed to the eAN via HRPD wireless interface, the HRPD connection between the eAT and the eAN is named as physical connection.

Compared with physical connection, the Virtual Connection has the difference lying in that the establishment of Virtual Connection cannot result in the updating of the binding of Proxy Mobile IP (PMIP) on the core network side. Particularly, when the HRPD connection between the eAT and the eAN is Virtual Connection, the PMIP binding still is kept between the Packet Data Network Gateway (P-GW) and the Serving Gateway (S-GW). At this moment, the HSGW of eHRPD is unnecessary to initiate a PMIP binding updating operation to the P-GW. When Pre-registration phase is completed, the eAT leaves from the E-UTRAN and takes handoff to the eHRPD, and after the eHRPD network is captured, in the case that the PMIP binding is not established between the HSGW and the P-GW, the HSGW needs to initiate the PMIP binding updating operation to establish the PMIP binding between the HSGW and the P-GW.

Since the Pre-registration operation of the eAT occurs at any time prior to the handoff from the E-UTRAN to the eHRPD, there is the scenario that the eAT or the eAN needs to initiate the virtual connection releasing. For instance, when the eAN receives the command from operation maintenance backstage, or in the case that the eAN after determines the Pre-registration of the eAT, backs to the E-UTRAN coverage area in which the Pre-registration is not necessary and resides for an enough long time period and so on, it is unnecessary for the HSGW to initiate PMIP binding updating. However, in the prior art, there is no corresponding solutions for how to realize the virtual connection releasing and how to enable the HSGW not to initiate the PMIP binding updating under virtual connection.

BRIEF SUMMARY OF THE INVENTION

Whereas, the present invention mainly aims at providing a virtual connection releasing method for inter-operation network, which enables the virtual connection releasing under the structure of the inter-operation between the E-UTRAN and the eHRPD, and further improves the virtual connection maintenance under the structure of the inter-operation between the E-UTRAN and the eHRPD.

For obtaining the above object, the technical solution of the present invention is achieved as follows:

The present invention provides a virtual connection releasing method in an inter-operation network. In the inter-operation network between the Enhanced Universal Terrestrial Radio Access Network (E-UTRAN) and the evolved HRPD (eHRPD) access network, a PMIP indication is set for indicating whether the HRPD Serving Gateway (HSGW) needs to initiate the Proxy Mobile IP (PMIP) binding updating operation; and when the virtual connection releasing is initiated, the evolved Access Network (eAN) sends to the evolved Packet Control Function (ePCF) a A9-releasing-A8 message carrying the PMIP indication; and after obtaining the PMIP indication through the ePCF, the HRPD Serving Gateway determines whether to initiate the PMIP binding updating operation according to the PMIP indication.

In the above, the virtual connection releasing is initiated by a evolved Access Terminal (eAT), or initiated by the eAN.

When the virtual connection releasing is initiated by the eAT, and the method comprises:

S11, the eAT initiating to the eAN the virtual connection releasing;

S12, the eAN sending to the ePCF the A9-releasing-A8 message with the reason value of 'packet data entering into dormancy', setting the PMIP indication value set in the A9-releasing-A8 message as the value indicating that HSGW does not initiate PMIP binding updating, and starting a timer Trel9;

S13, after receiving the A9-releasing-A8 message, the ePCF sending to the HSGW an A11-registration request message without carrying an accounting information, and in the meantime starting a timer Tregreq;

S14, the HSGW determining not to initiate the PMIP binding updating operation according to the PMIP indication value, and returning an A11-registration response message to the ePCF;

S15, after receiving the A11-registration response message, the ePCF stopping the timer Tregreq, initiating releasing processes of all A8 connections, and sending an A9-releasing-A8 completion message to the eAN;

S16, after receiving the A9-releasing-A8 completion message, the eAN stopping the timer Trel9.

When the virtual connection releasing is initiated by the eAN, the method comprises:

S21, the eAN sending to the ePCF an A9-releasing-A8 message with the reason value of 'packet data entering into dormancy', setting the PMIP indication value set in the A9-releasing-A8 message as the value indicating that HSGW does not initiate PMIP binding updating, and starting a timer Trel9;

S22, after receiving the A9-releasing-A8 message, the ePCF sending to the HSGW an A11-registration request message without carrying an accounting message, and in the meantime starting a timer Tregreq;

S23, the HSGW determining not to initiate the PMIP binding updating operation according to the PMIP indication value, and returning an A11-registration response message to the ePCF;

S24, after receiving the A11-registration response message, the ePCF stopping the timer Tregreq, initiating the releasing processes of all A8 connections, and sending an A9-releasing-A8 completion message to the eAN;

S25, after receiving the A9-releasing-A8 completion message, the eAN stopping the timer Trel9.

S26, the eAN initiating the virtual connection releasing flow to the eAT.

In the above, step S26 can be executed in parallel with step S21 or step S22.

When the virtual connection releasing is initiated by the eAN, and the method comprises:

S31, the eAN initiating the virtual connection releasing to the eAT; the eAN sending to the ePCF an A9-releasing-A8 message with the reason value of 'packet data entering into dormancy', setting the PMIP indication value set in the A9-releasing-A8 message as the value indicating that the HSGW does not initiate PMIP binding updating, and starting a timer Trel9;

S32, after receiving the A9-releasing-A8 message, the ePCF sending to the HSGW an A11-registration request message without carrying an accounting message, and in the meantime starting a timer Tregreq;

S33, the HSGW determining not to initiate the PMIP binding updating operation according to the PMIP indication value, and returning an A11-registration response message to the ePCF;

S34, after receiving the A11-registration response message, the ePCF stopping the timer Tregreq, initiating the releasing processes of all A8 connections, and sending an A9-releasing-A8 completion message to the eAN; and S35, after receiving the A9-releasing-A8 completion message, the eAN stopping the timer Trel9; or, S41, the eAN sending to the ePCF an A9-releasing-A8 message with the reason value of 'packet data entering into dormancy', setting the PMIP indication value set in the A9-releasing-A8 message as the value indicating that the HSGW does not initiate PMIP binding updating, and starting a timer Trel9;

S42, after receiving the A9-releasing-A8 message, the ePCF sending to the HSGW an A11-registration request message without carrying an accounting message, and in the meantime starting a timer Tregreq; and the eAN initiating a virtual connection releasing flow to the eAT.

S43, the HSGW determining not to initiate PMIP binding updating operation according to the PMIP indication value, and returning an A11-registration response message to the ePCF, S44, after receiving the A11-registration response message, the ePCF stopping the timer Tregreq, initiating the releasing processes of all A8 connections, and sending an A9-releasing-A8 completion message to the eAN; and S45, after receiving the A9-releasing-A8 completion message, the eAN stopping the timer Trel9.

In the above scheme, the step of setting PMIP indication comprises: adding a new message unit, a new field or a new domain in the A9-releasing-A8 message as the PMIP indication; or the step of setting PMIP indication comprises: setting a reserved value in an existing message unit, or an existing field, or an existing domain is set as the PMIP indication.

In the above scheme, the particular process of setting the PMIP indication value in the A9-releasing-A8 message as the value indicating that the HSGW does not initiate PMIP binding updating is: setting the PMIP indication value as 0.

The virtual connection releasing method in inter-operation network provided by the present invention is applicable to the structure of the inter-operation between the E-UTRAN and the eHRPD. With the present invention, when the established virtual connection needs to be released, by setting the PMIP indication for indicating whether the HSGW needs to initiate PMIP binding updating operation in the A9-releasing-A8 message before the eAT takes handoff to the eHRPD through the E-UTRAN, the HSGW is made to determine whether to initiate PMIP binding updating operation according to the PMIP indication, therefore realizing the virtual connection releasing under the structure of the inter-operation between the E-UTRAN and the eHRPD, and improving the virtual connection maintenance under the structure of the inter-operation between the E-UTRAN and the eHRPD.

The PMIP indication set in the present invention can be a new message unit, or a new field, or a new domain in the message, and also can be a reserved value in an existing message unit, or in an existing field, or in an existing domain, and the realization is simple, convenient and flexible.

BRIEF DESCRIPTION OF THE ACCOMPANYING DRAWINGS

The drawings herein are used to provide further understanding of the present invention and form a part of the specification, which are used to explain the present invention together with embodiments of the present invention, rather than unduly limit the present invention. In the accompanying drawings.

DETAILED DESCRIPTION OF THE PREFERRED EMBODIMENTS

A detailed description is given to the invention with reference to the accompanying drawings and in conjunction with the embodiments.

The basic principle of the present invention is that the PMIP indication which is used for indicating whether HSGW needs to initiate PMIP binding updating operation is set in a A9-releasing-A8 message of inter-operation network between E-UTRAN and the eHRPD, the HSGW determines whether to initiate a PMIP binding updating operation according to the PMIP indication wherein when the initiation of the PMIP binding updating operation is unnecessary, the HSGW does not initiate the PMIP binding updating operation to the P-GW, therefore improving the virtual connection maintenance under the structure of the inter-operation between the E-UTRAN and the eHRPD.

In the above, setting PMIP indication can be achieved by adding a new message unit, a new field or a new domain in the A9-releasing-A8 message as the PMIP indication; or by setting a reserved value in the existing message unit, or the existing field, or the existing domain as the PMIP indication.

The value of PMIP indication can be arbitrarily set, for instance, when the PMIP indication value is set as 0, it represents that the initiation of the PMIP binding updating operation is unnecessary, and when the PMIP indication value is 1, it represents that the initiation of the PMIP binding updating operation is necessary; or, when the PMIP indication value is set as true, it represents that the initiation of the PMIP binding updating operation is unnecessary, and when the PMIP indication value is set as false, it represents that the initiation of the PMIP binding updating operation is necessary, and so on, as long as whether the PMIP binding updating operation is necessary can be clearly represented.

The virtual connection releasing process can be initiated by the eAT or the eAN. The virtual connection releasing flows initiated by the eAT and the eAN will be respectively detailed hereinafter in connection with the embodiments and drawings.

Figure 1:
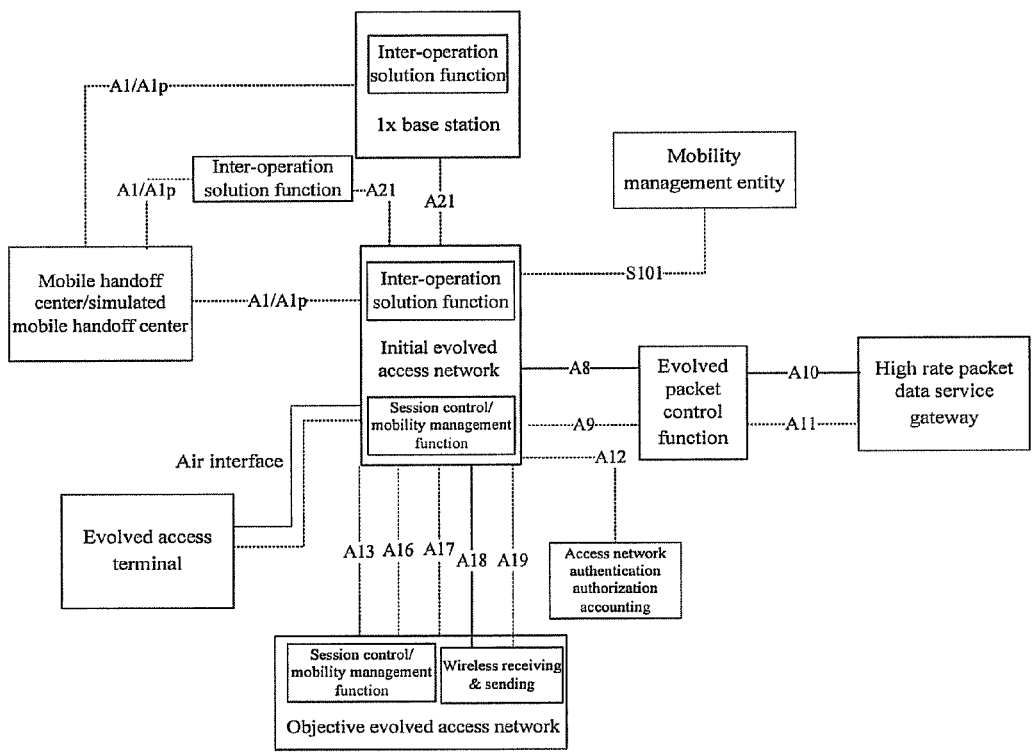
FIG. 1 is a schematic diagram of the network structure of the inter-operation network between E-UTRAN and the eHRPD in the prior art.
Figure 2:
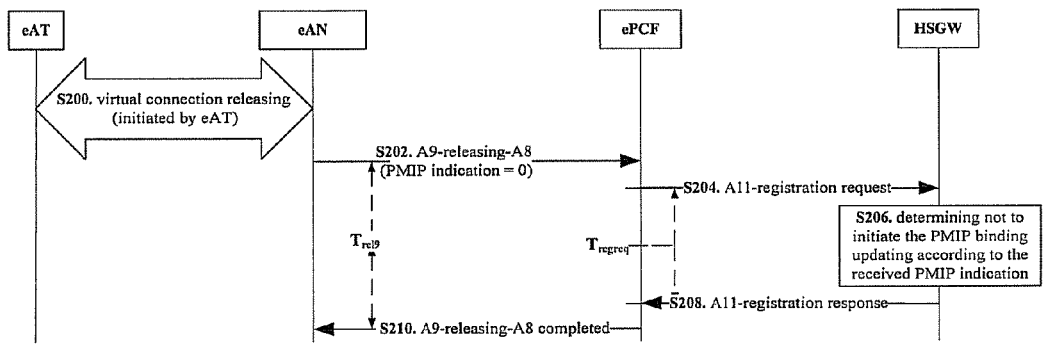
FIG. 2 is a flowchart of the realization of an embodiment of the eAT initiating virtual connection releasing in the present invention.

FIG. 2 is a flowchart of the realization of an embodiment of virtual connection releasing initiated by the eAT in the present invention. As shown in FIG. 2, the virtual connection releasing method under the structure of the inter-operation between the E-UTRAN and the eHRPD comprises the following steps:

Step S200, the eAT initiates the virtual connection releasing to the eAN.

Herein, the virtual connection releasing initiated by the eAT can adopt the initiation method and process of the virtual connection releasing in the eHRPD network.

Step S202, after determining the eAT initiate the virtual connection releasing, the eAN sends an A9-releasing-A8 message with the reason value of 'packet data entering into dormancy' to the ePCF to request for releasing all A8 connections; and in the meantime, sets the PMIP indication value set in the A9-releasing-A8 message as the value indicating that the HSGW does not initiate PMIP binding updating, and the eAN starts a timer Trel9.

Herein, a message unit, or a field, or a domain for bearing the PMIP indication is preset, where the PMIP indication value is set. In the present embodiment, when the PMIP indication value is set as 0, it represents that HSGW does not initiate the PMIP binding updating.

Step S204, after receiving the A9-releasing-A8 message, the ePCF sends to the HSGW an A11-registration request message without carrying an accounting information, and in the meantime, starts a timer Tregreq.

In the above, the A11-registration request message per se includes the PMIP indication, in which after receiving the A9-releasing-A8 message, the ePCF sets the PMIP indication value in the A11-registration request message as 0 according to the PMIP indication value in the A9-releasing-A8 message.

Step S206, after receiving the A11-registration request message, the HSGW detects that the PMIP indication value carried in the A11-registration request message is 0, then it determines not to initiate PMIP binding updating operation, namely, the HSGW does not initiate a PMIP binding updating operation to the P-GW.

Step S208, the HSGW returns an A11-registration response message to the ePCF, and the ePCF stops the timer Tregreq after receiving the A11-registration response message.

Step S210, the ePCF initiates the releasing process of all A8 connections, and sends the A9-releasing-A8 completion message to the eAN, and the eAN stops the timer Trel9 after receiving the A9-releasing-A8 completion message. At this moment, A10 connection is kept in a hold state.

Figure 3:
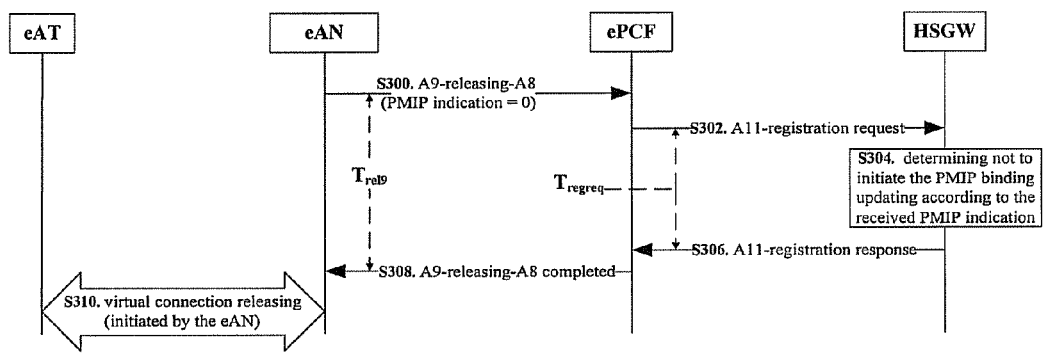
FIG. 3 is a flowchart of the realization of an embodiment of the eAN initiating virtual connection releasing in the present invention.

FIG. 3 is a flowchart of the realization of an embodiment of virtual connection releasing initiated by the eAN in the present invention. As shown in FIG. 3, the virtual connection releasing method under the structure of the inter-operation between the E-UTRAN and the eHRPD comprises the following steps:

Step S300, in order to release all A8 connections, the eAN sends to the ePCF an A9-releasing-A8 message with the reason value of 'packet data entering into dormancy', to request the ePCF to initiate the virtual connection releasing; and in the meantime, sets the PMIP indication value set in the A9-releasing-A8 message as the value indicating that it is unnecessary for HSGW to initiate PMIP binding updating, and the eAN starts a timer Trel9.

Herein, a message unit, or a field, or a domain for bearing the PMIP indication is preset, where the PMIP indication value is set. In the present embodiment, when the PMIP indication value is set as 0, it represents that the HSGW does not initiate the PMIP binding updating.

Step S302, after receiving the A9-releasing-A8 message, the ePCF sends to the HSGW an A11-registration request message without carrying an accounting message, and in the meantime, starts a timer Tregreq.

In the above, the A11-registration request message per se includes the PMIP indication, in which after receiving the A9-releasing-A8 message, the ePCF sets the PMIP indication value in the A11-registration request message as 0 according to the PMIP indication value in the A9-releasing-A8 message.

Step S304, after receiving the A11-registration request message, the HSGW detects that the PMIP indication value carried in the A11-registration request message is 0, then determines not to initiate PMIP binding updating operation, namely, the HSGW does not initiate PMIP binding updating operation to the P-GW.

Step S306, the HSGW returns an A11-registration response message to the ePCF, and the ePCF stops the timer Tregreq after receiving the A11-registration response message.

Step S308, the ePCF acknowledges the receipt of the A9-releasing-A8 message via sending A9-releasing-A8 completion message, and the eAN stops the timer Trel9 after receiving the A9-releasing-A8 completion message. At this moment, the A10 connection is kept in a hold state.

Step S310, the eAN initiates the virtual connection releasing flow to the eAT.

In the practical application, the present step can be executed prior to the step S300, or can be performed simultaneously with step S300 and S302.

In the above description, it can be seen that the embodiments mentioned above in present invention realized the virtual connection releasing under the structure of the inter-operation between E-UTRAN and eHRPD, and improved the virtual connection maintenance under the structure of the inter-operation between the E-UTRAN and the eHRPD.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only preferable embodiments of the present invention, but the protection scope of the present invention is not restricted to the descriptions. Therefore, any amendments, equivalent substitutions to the technical scheme of the present invention within the spirit and principle of the present invention are all concluded in the protection scope of the claims of the present invention.

What is claimed is:

1. A virtual connection releasing method in an inter-operation network, wherein the inter-operation network is between an Enhanced Universal Terrestrial Radio Access Network (E-UTRAN) and an evolved High Rate Package Data (eHRPD) access network, the method comprising:
   setting a PMIP indication for indicating whether a HRPD Serving Gateway (HSGW) needs to initiate a Proxy Mobile IP (PMIP) binding updating operation; and
   when a virtual connection releasing is initiated, an evolved Access Network (eAN) sends to an evolved Packet Control Function (ePCF) a A9-releasing-A8 message carrying the PMIP indication; and after obtaining the PMIP indication through the ePCF, the HRPD Serving Gateway determines whether to initiate the PMIP binding updating operation according to the PMIP indication,
   wherein the step of setting PMIP indication comprises:
   adding a new message unit, a new field or a new domain in the A9-releasing-A8 message as the PMIP indication; or
   the step of setting PMIP indication comprises: setting a reserved value in an existing message unit, or an existing field, or an existing domain in the A9-releasing-A8 message as the PMIP indication.

2. The virtual connection releasing method according to claim 1, wherein the virtual connection releasing is initiated by an evolved Access Terminal (eAT), or initiated by the eAN.

3. The virtual connection releasing method according to claim 1, wherein the virtual connection releasing is initiated by an eAT, and the method comprises:

the eAT initiating to the eAN the virtual connection releasing;

the eAN sending to the ePCF the A9-releasing-A8 message with the reason value of 'packet data entering into dormancy', setting the PMIP indication value set in the A9-releasing-A8 message as the value indicating that HSGW does not initiate PMIP binding updating, and starting a timer Trel9;

after receiving the A9-releasing-A8 message, the ePCF sending to the HSGW an A11-registration request message without carrying an accounting Information, and in the meantime starting a timer Tregreq;

the HSGW determining not to initiate the PMIP binding updating operation according to the PMIP indication value, and returning an A11-registration response message to the ePCF;

after receiving the A11-registration response message, the ePCF stopping the timer Tregreq, initiating releasing process of all A8 connections, and sending an A9-releasing-A8 completion message to the eAN; and after receiving the A9-releasing-A8 completion message, the eAN stopping the timer Trel9.

4. The virtual connection releasing method according to claim 1, wherein the virtual connection releasing is initiated by an eAN, and the method comprises:

the eAN sending to the ePCF an A9-releasing-A8 message with the reason value of 'packet data entering into dormancy', setting the PMIP indication value set in the A9-releasing-A8 message as the value indicating that HSGW does not initiate PMIP binding updating, and starting a timer Trel9;

after receiving the A9-releasing-A8 message, the ePCF sending to the HSGW an A11-registration request message without carrying an accounting message, and in the meantime starting a timer Tregreq;

the HSGW determining not to initiate the PMIP binding updating operation according to the PMIP indication value, and returning an A11-registration response message to the ePCF;

after receiving the A11-registration response message, the ePCF stopping the timer Tregreq, initiating the releasing process of all A8 connections, and sending an A9-releasing-A8 completion message to the eAN;

after receiving the A9-releasing-A8 completion message, the eAN stopping the timer Trel9; and the eAN initiating the virtual connection releasing flow to the eAT.

5. The virtual connection releasing method according to claim 1, wherein the virtual connection releasing is initiated by an eAN, and the method comprises:

the eAN initiating the virtual connection releasing to an eAT; the eAN sending to the ePCF an A9-releasing-A8 message with the reason value of 'packet data entering into dormancy', setting the PMIP indication value set in the A9-releasing-A8 message as the value indicating that the HSGW does not initiate PMIP binding updating, and starting a timer Trel9;

after receiving the A9-releasing-A8 message, the ePCF sending to the HSGW an A11-registration request message without carrying an accounting message, and in the meantime starting a timer Tregreq;

the HSGW determining not to initiate the PMIP binding updating operation according to the PMIP indication value, and returning an A11-registration response message to the ePCF;

after receiving the A11-registration response message, the ePCF stopping the timer Tregreq, initiating the releasing process of all A8 connections, and sending an A9-releasing-A8 completion message to the eAN; and after receiving the A9-releasing-A8 completion message, the eAN stopping the timer Trel9;

or, the eAN sending to the ePCF an A9-releasing-A8 message with the reason value of 'packet data entering into dormancy', setting the PMIP indication value set in the A9-releasing-A8 message as the value indicating that the HSGW does not initiate PMIP binding updating, and starting a timer Trel9;

after receiving the A9-releasing-A8 message, the ePCF sending to the HSGW an A11-registration request message without carrying an accounting message, and in the meantime starting a timer Tregreq and the eAN initiating a virtual connection releasing flow to the eAT;

the HSGW determining not to initiate PMIP binding updating operation according to the PMIP indication value, and returning an A11-registration response message to the ePCF;

after receiving the A11-registration response message, the ePCF stopping the timer Tregreq, initiating the releasing process of all A8 connections, and sending an A9-releasing-A8 completion message to the eAN; and after receiving the A9-releasing-A8 completion message, the eAN stopping the timer Trel9.

6. The virtual connection releasing method according to claim 3 or 4 or 5, wherein the particular process of setting the PMIP indication value in the A9-releasing-A8 message as the value indicating that the HSGW does not initiate PMIP binding updating is: setting the PMIP indication value as 0.

* * * * *